(12) United States Patent
Panzer

(10) Patent No.: US 8,320,454 B2
(45) Date of Patent: Nov. 27, 2012

(54) FAST SUB-PIXEL MOTION ESTIMATION

(75) Inventor: Adi Panzer, Tel Aviv (IL)

(73) Assignee: Ceva D.S.P. Ltd., Herzlia Pituach (IL)

( * ) Notice: Subject to any disclaimer, the term of this patent is extended or adjusted under 35 U.S.C. 154(b) by 913 days.

(21) Appl. No.: 12/369,849

(22) Filed: Feb. 12, 2009

(65) Prior Publication Data

US 2010/0202531 A1    Aug. 12, 2010

(51) Int. Cl.
*H04N 7/12* (2006.01)
(52) U.S. Cl. .......... 375/240.16; 375/240.12; 375/240.17
(58) Field of Classification Search ............. 375/240.16, 375/240.12, 240.17
See application file for complete search history.

(56) References Cited

U.S. PATENT DOCUMENTS

| | | | |
|---|---|---|---|
| 4,645,459 A * | 2/1987 | Graf et al. | 434/43 |
| 6,464,643 B1 * | 10/2002 | Brock-Fisher | 600/458 |
| 2004/0017853 A1 * | 1/2004 | Garrido et al. | 375/240.16 |
| 2005/0018772 A1 * | 1/2005 | Sung et al. | 375/240.16 |
| 2005/0047504 A1 * | 3/2005 | Sung et al. | 375/240.2 |
| 2005/0135488 A1 * | 6/2005 | Selby | 375/240.17 |
| 2005/0265454 A1 * | 12/2005 | Muthukrishnan et al. | 375/240.16 |
| 2005/0286777 A1 * | 12/2005 | Kumar et al. | 382/232 |
| 2006/0280248 A1 * | 12/2006 | Kim et al. | 375/240.16 |
| 2007/0230914 A1 * | 10/2007 | Garrido et al. | 386/98 |
| 2009/0168887 A1 | 7/2009 | Lin | |

OTHER PUBLICATIONS

Espacenet search, Espacenet Result List, Dec. 2011.*
Hill P R et al, "Interpolation Free Subpixel Accuracy Motion Estimation", Dec. 2006.*
Kwon D N et al, "Sub-pixel accuracy motion estimation using linear approximate model of the error criterion function", 2005.*
Akbulut et al, "Fast Sub-pixel Estimation by Means of one bit transformation", 2006.*
Argyriou et al, A Study of sub-pixel motion estimation using phase correlation, 2008.*
Hua et al, "Fast Sub-pixel Motion Estimation Algorithm for H.264" Aug. 2007.*
Koc et al, "Interpolation-Free Subpixel Motion Estimation Techniques in DCT Domain", Aug. 1998.*
Li Bo et al, "A Fast Sub-pel Motion Estimation Algorithm based on Best Position Calculation", Feb. 2006.*
Suh et al, "Fast Sub-pixel Motion Estimation Techniques Having Lower Computational Complexity", Aug. 2004.*
Zhang et al, "Fast sub-pixel motion estimation based on directional information and adaptive block classification", 2008.*
Hill et al. "Interpolation Free subpixel Accuracy Motion Estimation" vol. 16, No. 12, Dec. 2006.*

(Continued)

*Primary Examiner* — Jung Kim
*Assistant Examiner* — Shan Elahi
(74) *Attorney, Agent, or Firm* — Pearl Cohen Zedek Latzer, LLP

(57) ABSTRACT

Embodiments of the invention are directed to a system and method for sub-pixel motion estimation for video encoding. The method includes providing a best match between a source frame and a reference frame by generating a plurality of non linear building surfaces, generating, in real time, an estimated matching criteria surface representing a matching criteria between the source frame and the reference frame based on the building surfaces and a plurality of sample points of an actual matching criteria surface and selecting, in real time, a position on the estimated matching criteria surface.

17 Claims, 5 Drawing Sheets

OTHER PUBLICATIONS

Suh J W et al. "Fast Sub-Pixel Motion Estimation Techniques having Lower Computational Complexity" IEEE Transactions on Consumer Electronics, IEEE Service Center, New York, NY US vol. 50, No. 3, Aug. 1, 2004 pp. 968-973 XP001225109.

Hill p. R et al. "Interpolation Free Subpixel Accuracy Motion Estimation." IEEE Transactions on Circuits and Systems for Video Technology, IEEE Service Center Piscataway, NJ US vol. 16, No. 12, Dec. 1, 2006. pp. 1519-1526 XP011151050.

Kwon D n. et al. "Sub-pixel Accuracy Motion Estimation Using Linear Approximate Model of the Error Criterion Function." Communications, Computers and Signal Processing, 2005. Pacrim. 2005 IEEE Pacific Rim Conference on Victoria, Bc, Canada. Aug. 24-26, 2005 Piscataway, NJ, US. Aug. 24, 2005, pp. 261-264 XP010841453.

European Search Report for Application No. EP 10152693. Date of completion of search Jun. 8, 2010.

\* cited by examiner

| F | Q | H | Q | F | Q | H | Q | F |
|---|---|---|---|---|---|---|---|---|
| Q | H+H | J+H | H+H | Q | H+H | J+H | H+H | Q |
| H | J+H | J | J+H | H | J+H | J | J+H | H |
| Q | H+H | J+H | H+H | Q | H+H | J+H | H+H | Q |
| F | Q | H | Q | F | Q | H | Q | F |
| Q | H+H | J+H | H+H | Q | H+H | J+H | H+H | Q |
| H | J+H | J | J+H | H | J+H | J | J+H | H |
| Q | H+H | J+H | H+H | Q | H+H | J+H | H+H | Q |
| F | Q | H | Q | F | Q | H | Q | F |

*FIG. 4B*

FAST SUB-PIXEL MOTION ESTIMATION

BACKGROUND

Digital video compression may be used in a variety of implementations, such as broadcasting, streaming and storage. Various video compression standards and method may include motion estimation which is the process of determining motion vectors that describe the transformation from one image to another; usually between adjacent frames in a video sequence.

For a current block in a current frame, the motion estimation algorithm may search for a best matching block in a search range of a target frame, which is the most similar to the current block. When relatively good match has been found, the motion estimation algorithm may assign motion vectors to the block, which indicate how far horizontally and vertically the block must be moved so that a match is made.

Finding the best match may be performed using a sub-pixels resolution. Theoretically, the motion estimation algorithm may calculate all possible sub-pixel locations within a search area before performing the search. Such method may require large memory space and processing resources. Accordingly, sub-pixel motion estimation algorithm which may reduce calculation complexity is desired.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 4A and 4B show a flowchart of an exemplary real-time implementation of sub-pixel motion estimation algorithm and a respective exemplary pixel map according to embodiments of the present invention.

Figure 1:
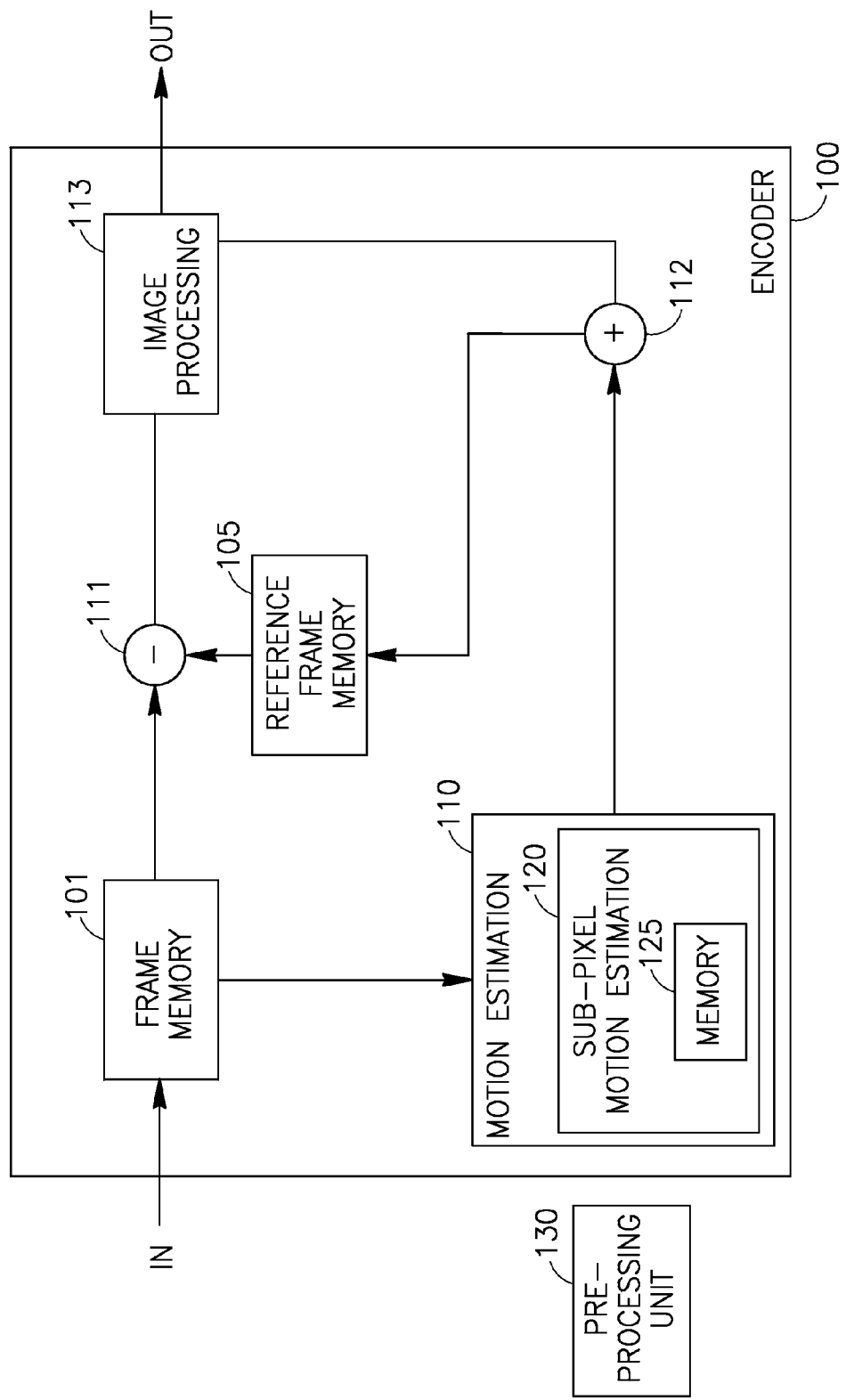
FIG. 1 is a block diagram of an exemplary video encoder according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF DEMONSTRATIVE EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Reference is now made to FIG. 1, which is a block diagram of an exemplary video encoder according to embodiments of the present invention. A video encoder 100 may receive a video stream as an input and may output an encoded video stream. Video encoder 100 may include a motion estimation/compensation block 110 able to perform fast sub-pixel motion estimation for calculating motion vectors. A motion vector may represent a transformation from a first, source image or frame, stored in a frame memory 101 to another image or frame, e.g., reference frame, stored in a reference frame memory 105. An image or frame may be divided into blocks, e.g., macro blocks (MB), where each block may include a group of pixels, for example, 16×16 pixels.

Estimation/compensation block 110 may search for a block in a search range within a reference frame stored in memory 105 that is most similar to a block within a source or a current frame stored in memory 101 to be the best matching block. When a match has been found, the motion estimation algorithm implemented by estimation/compensation block 110, may assign motion vectors to the block, which indicate how far horizontally and vertically the block must be moved so that a match is made between the source frame and the reference frame.

In order to find the best match for a selected block of a first frame, a motion estimation algorithm may search for the most similar block in a second frame. The term "matching criterion" between a source frame and a reference frame as described herein may refer to a value that describes the difference between the two frames, or between two areas within the frames. For example, when trying to search for a selected MB of a source frame inside a search area defined in a reference frame, the difference between the selected MB of the source frame and each MB in the search area may measured in any applicable manner, such as Sum of Absolute Differences (SAD), Sum of Square Differences (SSD), Hadamard transform. Any other suitable method, formula or calculation may be used.

Motion estimation/compensation block 110 may include a sub-pixel motion estimation block 120 which may perform or implement a motion estimation algorithm having sub-pixels resolution. The sub-pixels estimation block 120 may provide a best match between a first image, e.g., a source frame and a second image e.g., a reference frame without the need to calculate the matching criterion for all possible full pixel locations and all possible sub-pixel locations according to the selected resolution within a search area in the reference frame. According to embodiments of the invention, sub-pixel motion estimation block 120 may generate, in real time, an estimated matching criteria surface representing a matching criterion between the first image and the second image based on a set of building surfaces and a plurality of sample points of actual matching criteria surface.

Sub-pixel estimation block 120 may include a memory 125 to store or save results of computational operations performed on and received from a pre-processing unit, for example, pre-processing unit 130. Memory 125 may save the computational results from pre-processing unit 130 in any form or method, for example, in a table form, as a list or in any other way. Memory 125 may be a computer-storage medium having stored thereon instructions that use the results of the pre-processing algorithm during real-time encoding.

Pre-processing unit 130 may generate a plurality of non-linear building surfaces used to estimate the matching criterion between a source frame and a reference frame. These surfaces and other parameters originating from pre-processing unit 130, such as displacement points may be delivered to sub-pixel estimation block 120 as input data, as described with reference to FIG. 2.

Pre-processing unit 130 may be implemented external to encoder 100, for example, on a computing device, separated from encoder 100. In some embodiments, pre-processing unit 130 may be integrated in motion estimation block 110 or may be implemented as a stand alone unit inside encoder 100. Pre-processing unit 130 may execute or implement a pre-processing algorithm, also referred to herein as a "design phase" which may be performed or executed previously to the process of motion estimation/compensation block 110 and/or previously to the process of encoder 100, e.g., not in real-time.

The design phase, performed by pre-processing unit 130, may be performed once before the actual motion estimation has begun, e.g., before motion estimation block 110 is activated for the first time. It should be understood to a person skilled in the art that pre-processing algorithm implemented by pre-processing block 130 may not be executed in run time of encoder 100 and that by pre-processing block 130 may be implemented on a computing device different from the computing platform of encoder 100.

The design phase executed by processing unit 130 may be specific to a certain application, a specific encoder 100 and/or to a certain video compression standard, e.g., MPEG-2, MPEG-4, H.264. Any other parameters may be taken into consideration while performing the design phase algorithm by pre-processing unit 130.

Encoder 100 may farther include other blocks, modules, operations and units, for example, subtractor 111, adder 112 and image processing block 113 which may perform or may take part in performing encoding functions or operations. In the exemplary illustration of FIG. 1, image processing block 113 may include any operation, function or method which may be a part of the encoding process for example, Discrete Cosine Transform (DCT), quantization, entropy coding or any other function, calculation or process, however, it should be understood to a person skilled in art that the invention is not limited in this respect and according to embodiments of the present invention any number and any kind of blocks, units and/or modules may be included in encoder 100 and may be a part of the encoding process.

Figure 2:
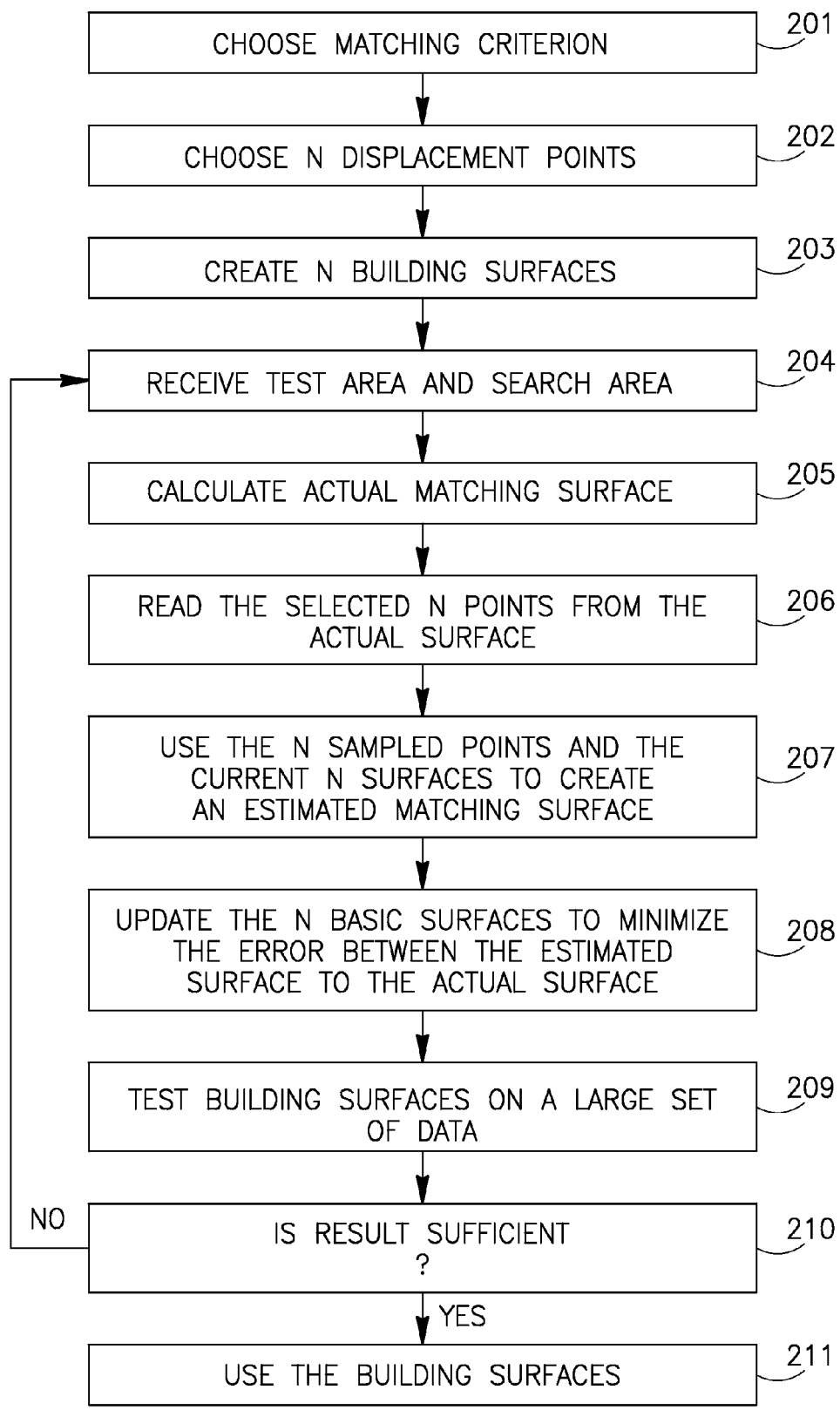
FIG. 2 is a flowchart of a method for performing pre-processing algorithm for sub-pixel motion estimation according to embodiments of the present invention.

Reference is now made to FIG. 2, which is a flowchart of a method for performing a pre-processing algorithm for sub-pixel motion estimation according to embodiments of the present invention. Operations of the method may be implemented by, for example, pre-processing unit 130 which may be implemented internally or/and externally to encoder 100 of FIG. 1, and/or by any other suitable units, devices, and/or systems. Operations of the pre-processing algorithm may be performed previously to operations performed by sub-pixel estimation block 120 of encoder 100 of FIG. 1. Operations of the pre-processing algorithm may be considered a "set-up" or "design" phase, namely, the operations may performed separately both in time and in place from the operations performed by encoder 100 in real-time during runtime. These design-phase operations may be performed at least once before encoder 100 is initialized in order to generate parameters and perform calculations which may be used later during "run-time".

During the design or pre-processing phase, the method may build a plurality of surfaces, also referred to herein as "building surfaces" used to estimate the matching criterion. These surfaces may be used to predict the behavior of the actual matching criterion, based on a plurality of samples.

As indicated at box 201, the method may include choosing one or more matching criterions. The matching criterion between a source frame and a reference frame is a value that describes the difference between the two frames, or between two areas within the frames. For example, when trying to search for a selected macro block (MB) of a source frame inside a search area defined in a reference frame, the difference between the selected MB of the source frame and each MB in the search area may be calculated, for example, using SAD, SSD or any other method.

As indicated at box 202, the method may include choosing a plurality displacement points to be used as sample points during pre-processing, for example n displacement points.

As indicated at box 203, the method may include generating, creating or defining n non-linear building surfaces which may be modified until reaching an optimal set of non-linear building surfaces. The non-linear building surfaces may be used for estimating a matching criterion between a first image and a second image during pre-processing in order to perform motion estimation. The number of the surfaces "n" may be determined by and/or respective to the quantity of the "n" displacement points chosen at box 202. The locations of these "n" displacement points may affect the construction of the "n" building surfaces. For example, the "n" displacement points may be evenly distributed on a specific search area.

Theoretically, generating the building surfaces may require solving $m*(2p+1)^2$ equations where m is the number of surfaces used and p is the search area size in terms of sub pixel locations, namely the maximum allowed displacement points covered by the surfaces. This may lead to infinite number of solutions since all surfaces and interpolation points are the same. Embodiments of the invention may use a base of orthogonal surfaces in which each surface may keep its symmetry. For example, the construction of the n building surfaces may be calculated by using a polynomial structure for each axis. An exemplary first degree polynomial equation which may form the building surface is defined in Equations 1-3 below:

$$Z_x = a_{x1}x + a_{x0} \quad (1)$$

$$Z_y = a_{y1}y + a_{y0} \quad (2)$$

Equations 1 and 2 yields equation 3:

$$Z = a_{x1}a_{y1}xy + a_{x1}a_{y0}x + a_{x0}a_{y1} + a_{x0}a_{y0} = a_3xy + a_2x + a_1y + a_0 \quad (3)$$

The exemplary surface represented by equation 3 has four free coefficients, namely, a3, a2, a1 and a0. Higher order polynomial equations may have $(n+1)^2$ coefficients where n may represent the polynomial degree. Finding the free coefficients may be based on real image data as described below.

As indicated at box 204, the method may include receiving a source frame or block, also referred to herein as "test area" and a reference frame or block, also referred to herein as "search area", where both frames or blocks may include data, which is typical of the application used by the pre-processing algorithm as statistical data in order to find optimal building surfaces. The method may use a large number of sets of typical source frames and reference frames to calculate an optimal set of non-linear building surfaces in an iterative fashion as described below.

As indicated at box 205, the method may include calculating an actual matching surface between the source frame and the reference frame. Calculating the actual matching surface may include a full search, namely calculation of one or more matching criterion at all full pixel locations and a plurality of sub-pixel locations. The calculated actual matching surface may describe the match between the source frame and reference frame.

As indicated at box 206, the method may include reading values on the actual matching surface calculated at box 205 at the n displacement points chosen at box 202, namely, sample the actual matching surface at the n displacement points.

As indicated at box 207, the method may include generating an estimated matching surface based on the samples from the actual matching surface, sampled at box 206 and the building surfaces defined at box 203. For example, the estimated matching surface may be generated by multiplying each of the n sample points (of box 202) by a respective one of the n building surface surfaces (of box 203) and summing the results.

As indicated at box 208, the method may include updating the n building surfaces, initiated at box 203 with basic orthogonal surfaces, such that the error between the estimated matching surface and the actual matching surface may be minimal. The updated building surfaces, may be used to predict the behavior the actual matching surface.

For example, each free coefficient of equation 3 has a typical surface that may be derived, for example, from statistical data, e.g., from the source frame and reference frame received at box 204. For example, the first degree polynomial surfaces may be defined as shown in equation 4 below:

$$Z = a_3 \begin{bmatrix} -1 & 0 & 1 \\ 0 & 0 & 0 \\ 1 & 0 & -1 \end{bmatrix} + a_2 \begin{bmatrix} -1 & 0 & 1 \\ -1 & 0 & 1 \\ -1 & 0 & 1 \end{bmatrix} + \quad \text{Equation 4}$$

$$a_1 \begin{bmatrix} 1 & 1 & 1 \\ 0 & 0 & 0 \\ -1 & -1 & -1 \end{bmatrix} + a_0 \begin{bmatrix} 1 & 1 & 1 \\ 1 & 1 & 1 \\ 1 & 1 & 1 \end{bmatrix}.$$

Minimizing the error between the estimated matching surface and the actual matching surface based on the statistical data may change the theoretical basic surfaces, represented in equation 4 to a different, more accurate representation of the actual matching surface as shown in equation 5 below:

$$Z = a_3 \begin{bmatrix} -2 & 0 & 2 \\ 0 & 0 & 0 \\ 2 & 0 & -2 \end{bmatrix} + a_2 \begin{bmatrix} -1 & 1 & 1 \\ -1 & 0 & 1 \\ -1 & -1 & 1 \end{bmatrix} + \quad \text{Equation 5}$$

$$a_1 \begin{bmatrix} 1 & 1 & 1 \\ 1 & 0 & -1 \\ -1 & -1 & -1 \end{bmatrix} + a_0 \begin{bmatrix} 1 & 2 & 1 \\ 2 & 1 & 2 \\ 1 & 2 & 1 \end{bmatrix}$$

As indicated at box 209, the method may include testing, checking or examining the updated basic surfaces, namely the building surfaces (of box 208) on a large set of data, e.g., a large number of typical source and reference pictures, frames or blocks of frames. The testing may include performing full motion estimation on the source and reference pictures using the estimated surface (of box 208). The total error between the estimated surface (of box 208) and the actual matching surface calculated (of block 205) may be compared to a desired predetermined threshold and if the total error is lower than the previously calculated total error or a certain predetermined threshold, current updated basic (building) surfaces may be used by an encoder in real-time processing as indicated at box 211.

In case the total error is above the threshold or not lower than the previously calculated total error, the method may include returning to box 204. In each iteration, the updated basic surfaces (building surfaces) may be used, instead of the initial basic surfaces created at box 203, otherwise, the original basic surfaces are used. Further, the iterative process described in FIG. 2 may be discontinued and the current updated surfaces may be used to create an estimated matching surface [box 211], even when the error is above the threshold, but changes in the surfaces parameters increase the total error.

Figure 3:
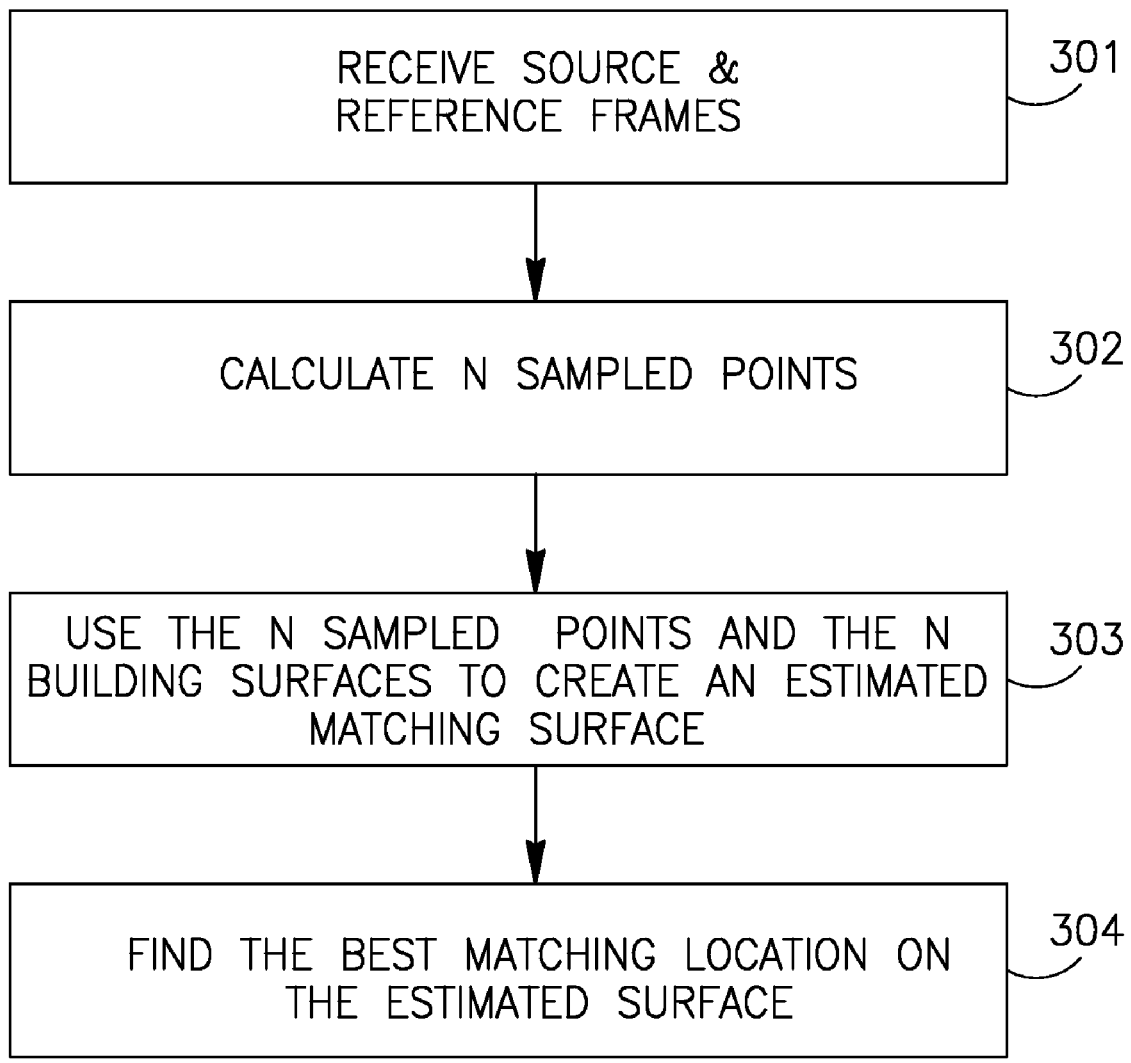
FIG. 3 is a flowchart of a method for performing a real-time sub-pixel motion estimation algorithm according to embodiments of the present invention.

The building surfaces may be used by sub-pixel motion estimation 120 of FIG. 1 in real-time processing in order to find the motion vector between a source frame and a reference frame as described with respect to FIG. 3.

Reference is now made to FIG. 3, which is a flowchart of a method for performing a dynamic sub-pixel motion estimation algorithm in real-time according to embodiments of the present invention. Operations of the method may be implemented by, for example, sub-pixel motion estimation block 120 of FIG. 1, and/or by other suitable units, devices, and/or systems. In some embodiments, operations of the sub-pixel motion estimation algorithm may be performed dynamically, in real-time during run-time of an encoding process, using results of operations performed by pre-processing unit 130 off-line. In other embodiments, the operations of pre-processing unit 130 may be performed in-real time during run-time of the encoding process, for example, for the purpose of updating the basic surfaces.

As indicated at box 301, the method may include receiving in real-time a source frame and a reference frame. The source frame and reference frame may be a frame of a video stream to be encoded by encoder 100 of FIG. 1.

As indicated at box 302, the method may include calculating in real-time the difference between the source frame and reference frame, namely, one or more matching criterions, at the location of n sampled points previously selected (box 202 of FIG. 2) according to the matching criterion previously chosen (box 201 of FIG. 2).

As indicated at box 303, the method may include generating an estimated matching surface based on the calculated samples (calculated at box 302) and the building surfaces from the pre-processing phase (box 211 of FIG. 2). For example, the estimated matching surface may be generated by multiplying each of the n sampled points by a respective one of the building surfaces calculated in the pre-processing phase and summing the results. The surface estimation process may obtain free coefficients of an equation that represents the actual matching surface based on the building surfaces found in the pre-processing phase without calculating the actual matching surface in real-time. The coefficients may be obtained by using known samples values, e.g., the calculated n sampled points. The number of sample points may be at least identical to the number of the free coefficients of the equation representing the actual matching surface. For example, for each free coefficient, a given value may be used in order to solve the set of equations. Solving the equations may be performed by solving a set of linear equations, for example, by using inversed matrix multiplication. In some embodiments number of sample points higher than the number of the free coefficients may be used.

As indicated at box 304, the method may include finding the best matching location on the estimated matching surface created at box 303, namely a point on the estimated surface which indicates a best match in terms of matching criterion. The best matching location may provide the required motion vector for performing a motion estimation/compensation process. For example, the best matching location may be the motion vector itself.

Figure 4A:
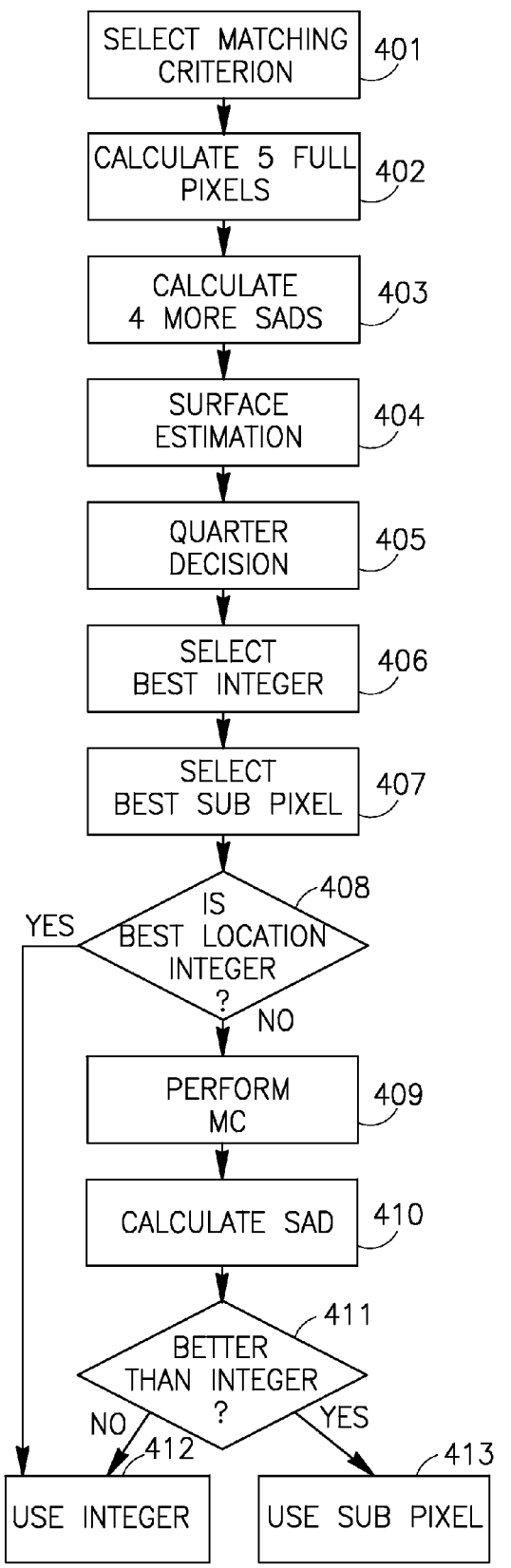

Reference is now made to FIG. 4A which is a flowchart of an exemplary real-time implementation of sub-pixel motion estimation algorithm according to embodiments of the present invention. Reference is now made to FIG. 4B which illustrates an exemplary pixel map of a search area helpful in understanding embodiments of the present invention.

The exemplary real-time implementation uses as input the results of a pre-processing design phase (described in FIG. 2) in which 9 building surfaces have been generated. The exemplary search area is defined as a diamond-shaped area 400 marked with horizontal lines.

The exemplary implementation represented by FIGS. 4a and 4b may include choosing SAD as a matching criterion (box 401). The actual samples calculated and used for the surface estimation are 5 full-pixel results and 4 half-pixel results. Therefore, 5 SAD values of full pixels (represented by "F" in FIG. 4B) are calculated (box 402). Additionally, 4 SAD values of two-dimensional half pixels (represented by "J" in FIG. 4B) are calculated (box 403).

As indicated at box 404, the method may include estimating a surface by solving, for example, 9 equations using matrix multiplication. The matrix multiplication may be computed previously in the design phase.

In order to further reduce calculation complexity, the method may further reduce search area 400 of FIG. 4B and may choose only a portion of the search area 400 most probable to contain the best match, for example, a portion 410 marked with both horizontal and vertical lines within diamond-shape area 400 (box 405). Such a choice may be based on results of samples or points in the search area, for example, samples represented by F and J in FIG. 4B. It should be understood to a person skilled in the art, however, that the method may be performed on the entire search area 400 and that any other part, section, region, portion or number of pixels of the search area may be chosen.

Once the surface has been estimated, all possible locations in the selected area may be evaluated. For example, all the possible locations with area 400 where quarter-pixels are represented by Q and two-dimensional half-pixels are represented by J. As indicated at box 406, the lowest SAD from all the full pixels, referred to herein as "best integer" may be selected. As indicated at box 407, the lowest SAD from all the sub-pixels, referred to herein as "best sub-pixel" may be selected.

The best integer and the best sub-pixel values may be compared. If the best location is the best integer then the full pixel may be used (box 412). If the best location is the best sub-pixel, a motion compensation (MC) operation may be performed (box 209) at the best location in order to create the actual reference to be used after the sub-pixel interpolation. Then, the real matching criteria, e.g., SAD, may be calculated and compared to the integer pixel results (box 410). If the calculated SAD is better than the integer result, the sub-pixel result may be used (box 413). If not, and the calculated SAD of the integer is better, then the integer result may be used (box 412).

Embodiments of the invention may control the appearing frequency of the different locations or positions on the estimated matching criteria surface by changing the building surfaces used to calculate the possible locations, for example, without changing the surface estimation matrix, or by using weights before comparing the calculated locations. Using different building surfaces for estimation and reconstruction may favor certain locations by artificially reducing their matching score, for example by reducing one or more sample values in specific locations on a surface with a same value in all samples, for example, one of the basic orthogonal surfaces. For example, in order to use certain positions when there is a benefit in term of matching criteria, surfaces that may cause the estimated matching criteria to be worse thus making this position less probable may be chosen.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein.

Embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components. In some embodiments, such system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for sub-pixel motion estimation in video encoding comprising:
   in a design phase performed off-line before runtime motion estimation has begun, generating a plurality of non-linear design-phase building surfaces in an iterative process using sets of input frames as statistical data, wherein the iterative process of the design phase comprises:
   for each iteration:
   calculating an actual design-phase matching criterion surface according to a received source frame and a reference frame;

generating an estimated design-phase matching criterion surface based on samples of the actual design-phase matching criterion surface in chosen displacement points and current design-phase building surfaces; and comparing an error between the estimated design-phase matching criterion surface and the actual design-phase matching criterion surface to a predetermined threshold;

generating, in real time, an estimated matching criterion surface representing a matching criterion between a first real-time image and a second real-time image based on the design-phase building surfaces and a plurality of sample points of an actual real-time matching criterion surface; and selecting, in real time, a location on the estimated matching criterion surface, wherein the location represents a best match between the first image and the second image.

2. The method of claim 1, wherein the design phase is specific to a certain application, a specific encoder or a certain video compression standard.

3. The method of claim 1, wherein the design-phase building surfaces are to predict behavior of the actual matching criterion surface.

4. The method of claim 1, wherein generating the design-phase building surfaces comprises:

selecting a plurality of displacement points to be used as sample points in the design phase;

defining an initial set of non-linear building surfaces using the sample points; and iteratively modifying the initial set based on statistical input image data to generate the plurality of design-phase building surfaces.

5. The method of claim 1, wherein generating the design-phase building surfaces comprises iteratively updating an initial set of design-phase building surfaces so as to minimize an error between an estimated design-phase matching criterion surface and an actual design-phase matching criterion surface.

6. The method of claim 1, wherein the location represents a motion vector.

7. A video encoding system for sub-pixel motion estimation comprising:

a pre-processing unit to perform a design phase off-line before runtime motion estimation has begun, wherein the pre-processing unit generates in the design phase a plurality of non-linear design-phase building surfaces in an iterative process using sets of input frames as statistical data;

a sub-pixel motion estimation block to generate, in real time, an estimated matching criterion surface representing a matching criterion between a first real-time image and a second real-time image based on the design-phase building surfaces and a plurality of sample points of an actual real-time matching criteria surface and to select, in real time, a location on the estimated matching criterion surface, wherein the location represents a best match between the first image and the second image, wherein the pre-processing unit is to iteratively optimize the plurality of design-phase building surfaces, wherein for each iteration the pre-processing unit receives a source frame and a reference frame; calculates an actual design-phase matching criterion surface according to the source frame and the reference frame; generates an estimated design-phase matching criterion surface based on samples of the actual design-phase matching criterion surface in chosen displacement points and current design-phase building surfaces; and compares an error between the estimated design-phase matching criterion surface and the actual design-phase matching criterion surface to a predetermined threshold.

8. The system of claim 7, wherein pre-processing unit performs the design phase specifically according to a certain application, a specific encoder or a certain video compression.

9. The system of claim 7, wherein the pre-processing unit is to generate the design-phase building surfaces such that design-phase building surfaces are suitable to predict behavior of the actual matching criterion surface.

10. The system of claim 7, wherein the pre-processing unit is to select a plurality of displacement points to be used as sample points in the design phase, define an initial set of non-linear building surfaces using the sample points and iteratively modify the initial set based on statistical input image data to generate the plurality of design-phase building surfaces.

11. The system of claim 7, wherein the pre-processing unit is to iteratively update an initial set of design-phase building surfaces so as to minimize an error between an estimated design-phase matching criterion surface and an actual design-phase matching criterion surface.

12. The system of claim 7, wherein the location represents a motion vector.

13. An article comprising a non-transitory computer-storage medium having stored thereon instructions that, when executed by a processing platform, result in:

in a design phase performed off-line before runtime motion estimation has begun, generating a plurality of non-linear design-phase building surfaces in an iterative process using sets of input frames as statistical data, wherein the instructions related to the iterative process of the design phase result for each iteration in:

calculating an actual design-phase matching criterion surface according to a received source frame and a reference frame;

generating an estimated design-phase matching criterion surface based on samples of the actual design-phase matching criterion surface in chosen displacement points and current design-phase building surfaces; and comparing an error between the estimated design-phase matching criterion surface and the actual design-phase matching criterion surface to a predetermined threshold;

generating, in real time, an estimated matching criterion surface representing a matching criterion between a first real-time image and a second real-time image based on the design-phase building surfaces and a plurality of sample points of an actual real-time matching criterion surface; and selecting, in real time, a location on the estimated matching criterion surface, wherein the location represents a best match between the first image and the second image.

14. The article of claim 13, wherein the instructions related to the design phase are specific to a certain application, a specific encoder or a certain video compression.

15. The article of claim 13, wherein the instructions related to the design phase result in generating the design-phase building surfaces to predict behavior of the actual matching criterion surface.

16. The article of claim 13, wherein the instructions related to the design phase when executed further result in:

selecting a plurality of displacement points to be used as sample points in the design phase;

defining an initial set of non-linear building surfaces using the sample points; and iteratively modifying the initial set based on statistical input image data to generate the plurality of design-phase building surfaces.

17. The article of claim 13, wherein the instructions related to the design phase when executed further result in:

iteratively updating an initial set of design-phase building surfaces so as to minimize an error between an estimated design-phase matching criterion surface and an actual design-phase matching criterion surface.

* * * * *